US007327560B1

(12) United States Patent
Tabasso et al.

(10) Patent No.: US 7,327,560 B1
(45) Date of Patent: Feb. 5, 2008

(54) KEYBOARD WITH INTEGRATED LAPTOP STAND

(75) Inventors: Alain Tabasso, Essertines (CH); Patrick Monney, Mex (CH); Alexis Richard, Cully (CH); Diarmuid Macmahon, Dublin (IE); Peter Sheehan, New Castle (IE); Keith Tritschler, Bray (IE); Brian Stephens, Dublin (IE); Linus Chien, Jhuebei (TW)

(73) Assignee: Logitech Europe S.A., Romanel-sur-Morges (CH)

( * ) Notice: Subject to any disclaimer, the term of this patent is extended or adjusted under 35 U.S.C. 154(b) by 0 days.

(21) Appl. No.: 11/265,528

(22) Filed: Nov. 1, 2005

(51) Int. Cl.
*G06F 1/16* (2006.01)
(52) U.S. Cl. ............ 361/680; 361/681; 361/683; 710/303; 710/304; 248/917
(58) Field of Classification Search ........ 361/680–683; 710/303, 304; 248/917
See application file for complete search history.

(56) References Cited

U.S. PATENT DOCUMENTS

| 5,469,327 | A | * | 11/1995 | Cheng | 361/680 |
| 5,822,185 | A | * | 10/1998 | Cavello | 361/686 |
| 5,841,424 | A | * | 11/1998 | Kikinis | 345/168 |
| 6,353,529 | B1 | * | 3/2002 | Cies | 361/681 |
| 6,538,642 | B2 | * | 3/2003 | Tsai | 345/168 |
| 6,724,614 | B1 | * | 4/2004 | Chiang et al. | 361/681 |
| 6,781,823 | B1 | * | 8/2004 | Nyack | 361/683 |
| 6,986,492 | B2 | * | 1/2006 | Huang et al. | 248/346.03 |
| 6,992,882 | B2 | * | 1/2006 | Wang | 361/681 |
| 2002/0171020 | A1 | * | 11/2002 | Huang et al. | 248/346.01 |
| 2003/0025674 | A1 | * | 2/2003 | Watanabe | 345/168 |
| 2004/0189602 | A1 | * | 9/2004 | Scott et al. | 345/156 |
| 2004/0212954 | A1 | * | 10/2004 | Ulla et al. | 361/680 |
| 2005/0111182 | A1 | * | 5/2005 | Lin et al. | 361/686 |
| 2005/0135049 | A1 | * | 6/2005 | Huang et al. | 361/683 |
| 2005/0236906 | A1 | * | 10/2005 | Morgan et al. | 307/117 |

\* cited by examiner

*Primary Examiner*—Jayprakash Gandhi
*Assistant Examiner*—Anthony Q Edwards
(74) *Attorney, Agent, or Firm*—Townsend and Townsend and Crew, LLP

(57) ABSTRACT

A full-size keyboard with an integrated laptop stand. In one embodiment, the laptop stand is part of a cover for a portable keyboard, with the cover unfolding and including a pop-up stand for supporting a portable computer. The stand is thus connected to the keyboard rather than being a separate article. The cover includes electronics, such as a USB hub and ports, an MP3 player docking station, speakers, etc. A flexible hinge connects the keyboard and cover, with imbedded electrical flex connectors. A presence sensor, such as a PIR sensor, shuts off battery use by these electronics when the user is not around.

33 Claims, 6 Drawing Sheets

KEYBOARD WITH INTEGRATED LAPTOP STAND

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention generally relates to laptop stands.

Because laptop computers typically have a smaller keyboard than normal, it is desirable to have a docking station to allow a laptop to be used with a full-size keyboard. Examples of docking stations or notebook computer stands are set forth in U.S. Pat. No. 6,583,985, No. 6,208,508 and No. 6,545,864. These stands support a notebook computer so that the display is raised, while allowing a normal, full-size keyboard to plug into the laptop or to wirelessly connect to the laptop.

Another type of design does not address providing a larger keyboard, but rather puts a display of a laptop in a better position, such as by making it detachable and put on a separate stand. Examples of such patents are U.S. Pat. Nos. 5,375,076, 5,319,582, 5,247,285, 6,304,431, 6,028,764, and published Applications No. 2005/0111182 and 2003/0052857.

BRIEF SUMMARY OF THE INVENTION

The present invention provides a full-size keyboard with an integrated laptop stand. In one embodiment, the laptop stand is part of a cover for a portable keyboard, with the cover unfolding and including a pop-up stand for supporting a portable computer. The stand is thus connected to the keyboard rather than being a separate article. This provides a number of advantages.

In one embodiment, the stand includes an integrated electronics such as a USB hub for connecting to the portable computer as well as other devices. In addition, a flexible hinge (e.g., an elastomeric material) connects the stand/cover to the keyboard with an imbedded flex circuit containing electrical connections between the keyboard and connectors on the stand.

In one embodiment, the stand includes other accessories, such as a pop-up web camera. Additionally, the stand may include a USB connector hardwired into the stand to connect the laptop to the keyboard or the USB hub, with the connector then being pluggable into the portable computer. This arrangement allows very short cables to be used, simplifying cable management.

In other embodiments, the integrated stand and keyboard include (in either the stand or keyboard portion) a number of other features, such as a microphone and speakers to facilitate voice-over IP (VOIP) operation, a docking station for an MP3 player along with built-in speakers and a microphone, a memory card reader, and a built-in WiFi or other wireless card.

In one embodiment, a presence sensor is used to control the use of battery power by the electronics in the cover. A PIR (Pyroelectric IR) sensor may be used to detect human body heat. Other presence detectors could be used, and the presence detector could also be used in a stand alone keyboard.

For further understanding of the nature and advantages of the invention, reference should be made to the following description taken in conjunction with the accompanying drawings.

DETAILED DESCRIPTION OF THE INVENTION

Keyboard/Stand Structure and Folding

Figure 1:
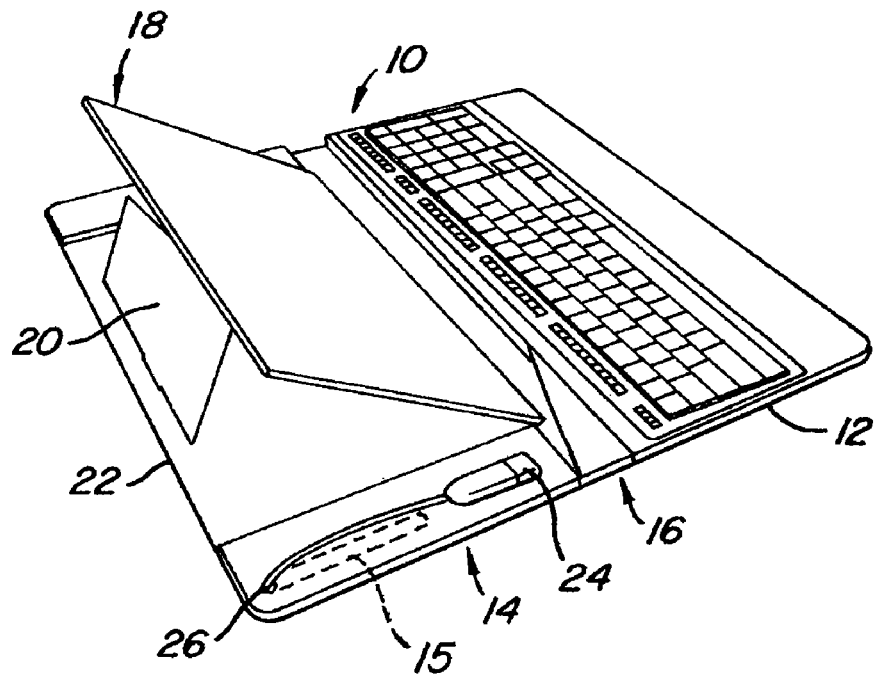
FIG. 1 is a perspective view of a keyboard with integrated stand according to an embodiment of the present invention.

FIG. 1 illustrates keyboard with integrated stand 10 according to an embodiment of the invention. A keyboard section 12 is connected to the stand section 14 by a hinge 16. Stand portion 14 acts as a cover for the keyboard when folded over. When unfolded as shown, an angled laptop computer support surface 18 is held up by a hinged flap 20. Flap 20 is hinged to the back of support 18, with its bottom portion providing a frictional support against a cover surface 22. Alternately, a series of grooves can be provided in cover 22 into which flap 20 can be placed to support the laptop at different angles.

Figure 2:
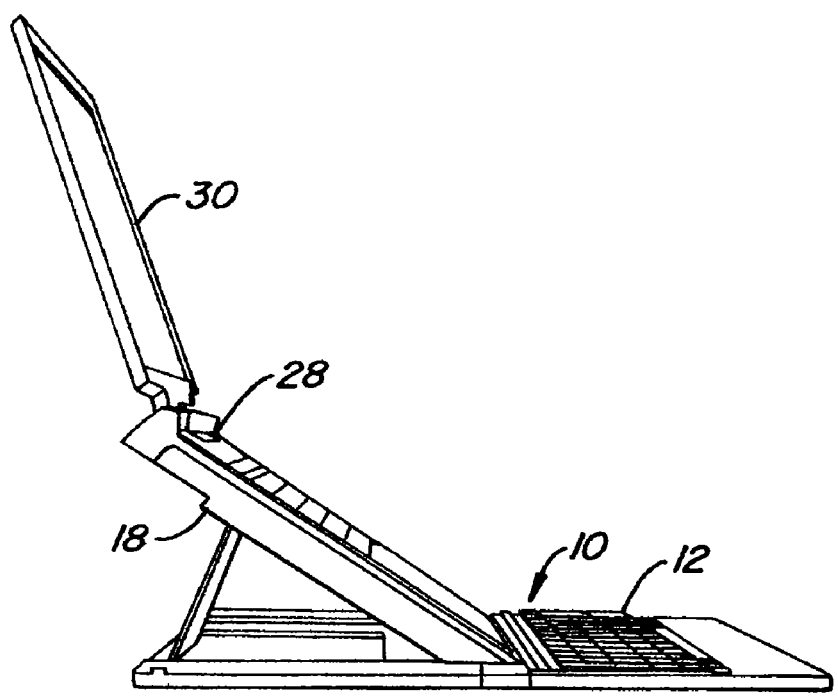
FIG. 2 is a side view of the keyboard with integrated stand of FIG. 1 with a laptop mounted on the stand.

FIG. 2 shows the integrated keyboard and stand 10 of FIG. 1 with a laptop computer 28 supported on support surface 18. As can be seen, this places the computer display 30 of laptop at a higher, more desirable position and allows the user access to the full-size keyboard 12 instead of using the laptop computer keyboard.

Figure 3:
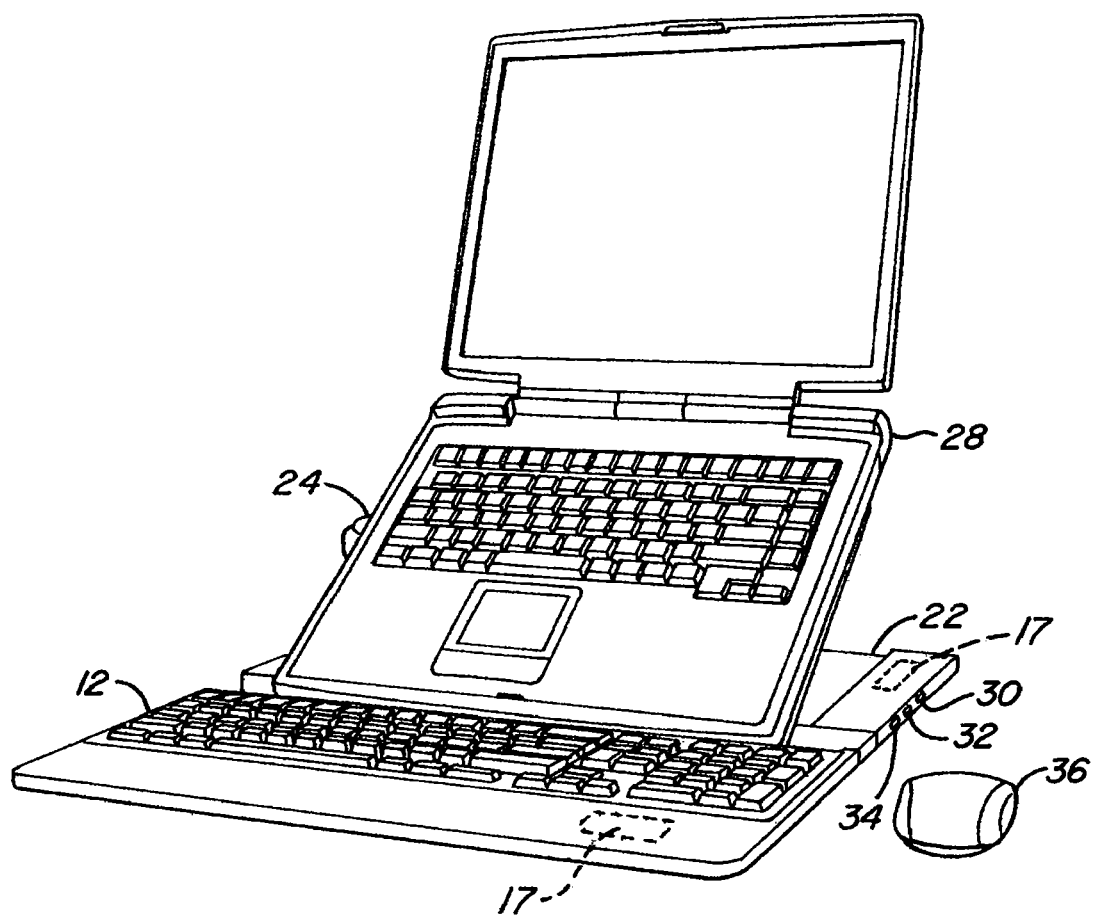
FIG. 3 is a front, perspective view of the embodiment of FIG. 2.

FIG. 3 is a front view showing the laptop 28 mounted on the integrated keyboard and stand. As can be seen, the full-size keyboard 12 is much larger than the smaller keyboard of the laptop. Also shown is the USB connector 24 connecting into the USB port of the laptop. Because of the proximity of the stand to the laptop, minimal cable length is needed, thus simplifying cable management. FIG. 3 shows a mouse 36. The keyboard or cover in one embodiment includes an imbedded wireless receiver for the mouse. This can be a 27 MHz receiver, a 2.4 GHz Receiver, a Bluetooth receiver, etc. Alternately, the keyboard or stand could have a cable port for allowing a wired mouse to plug into it.

Figure 4:
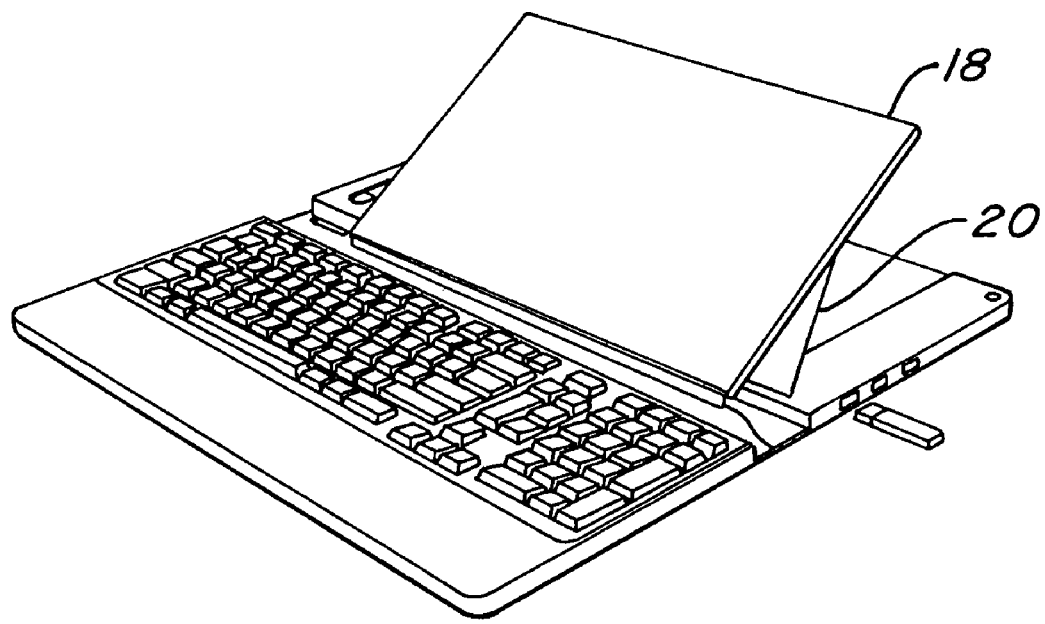
FIGS. 4-6 are diagrams illustrating the folding of the stand into a keyboard cover according to an embodiment of the invention.
Figure 5:
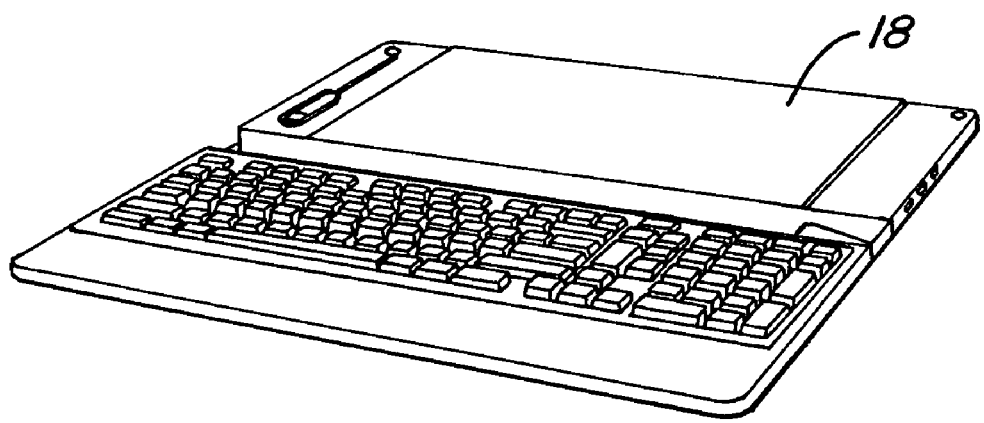
Figure 6:
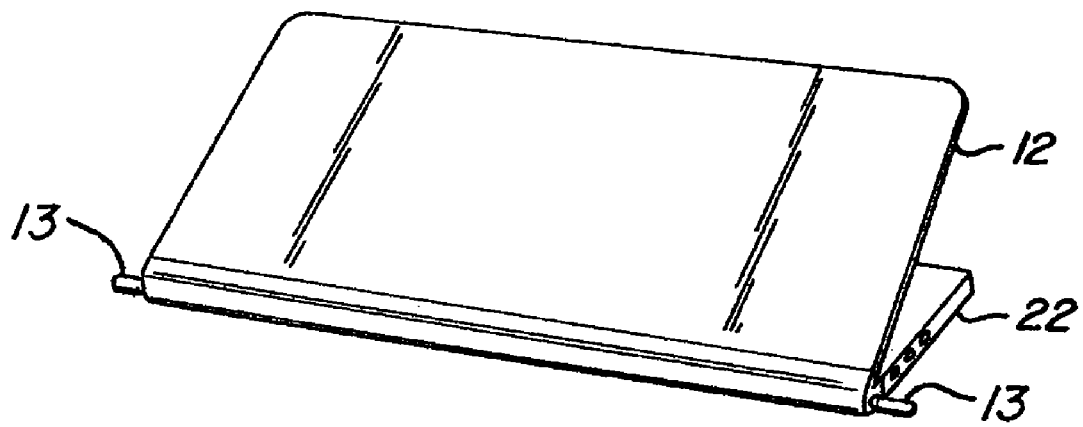

FIGS. 4-6 illustrate how the stand collapses into the cover, and the cover folds over to protect the keyboard and acts as a carrying case. In FIG. 4, support 20 is shown swinging inward so that support surface 18 can fold down into the collapsed position shown in FIG. 5. Keyboard section 12 can then be folded over onto cover 22, or vice versa, to provide a compact carrying case and protective cover for the keyboard. A latch is provided to secure keyboard section 12 to cover 22. In one embodiment, a handle is provided on cover 22. The handle slides into supports on either side for storage, and bows out in the middle when pulled to act as a handle, similar to some luggage handles. In one embodiment, either the keyboard section 12 or the cover 22 adjacent keyboard section 12 has retractable feet 13 for elevating the back portion of the keyboard. Hinge 16 has sufficient length and flexibility to allow both flat and raised positions of keyboard section 12.

USB Hub, USB Connector

FIG. 1 also shows a USB connector 24 which can be plugged into the USB port of the laptop computer on the stand. The USB connector 24 is connected by a USB cable to the cover 22 at a point 26. Internally, there can be storage 15 for more cable, which can be removed. The cable is connected to keyboard section 12 through hinge 16 in one embodiment. Alternately, or in addition, the cable is connected to an internal USB hub with multiple additional USB ports on the other side of cover 22, as can be seen in the view of FIG. 3. The USB ports could alternately be placed anywhere on stand section 14 or keyboard section 12. The stand may include 3-4 or more USB ports. Since a typical laptop computer only has 2 ports, this provides more flexibility in convenient locations. One or more of the USB ports can be used for a USB memory card (an embedded memory card can also be used).

On the right side of cover 22 in FIG. 3 are visible three USB ports 30, 32, and 34, which connect to an internal USB hub, which is also connected to USB connector 24. A separate mouse 36 is used, which could be connected by a wire to the laptop or wirelessly to a receiver in a USB stick, which can be plugged into a USB port of the laptop.

Web Cam

Figure 7:
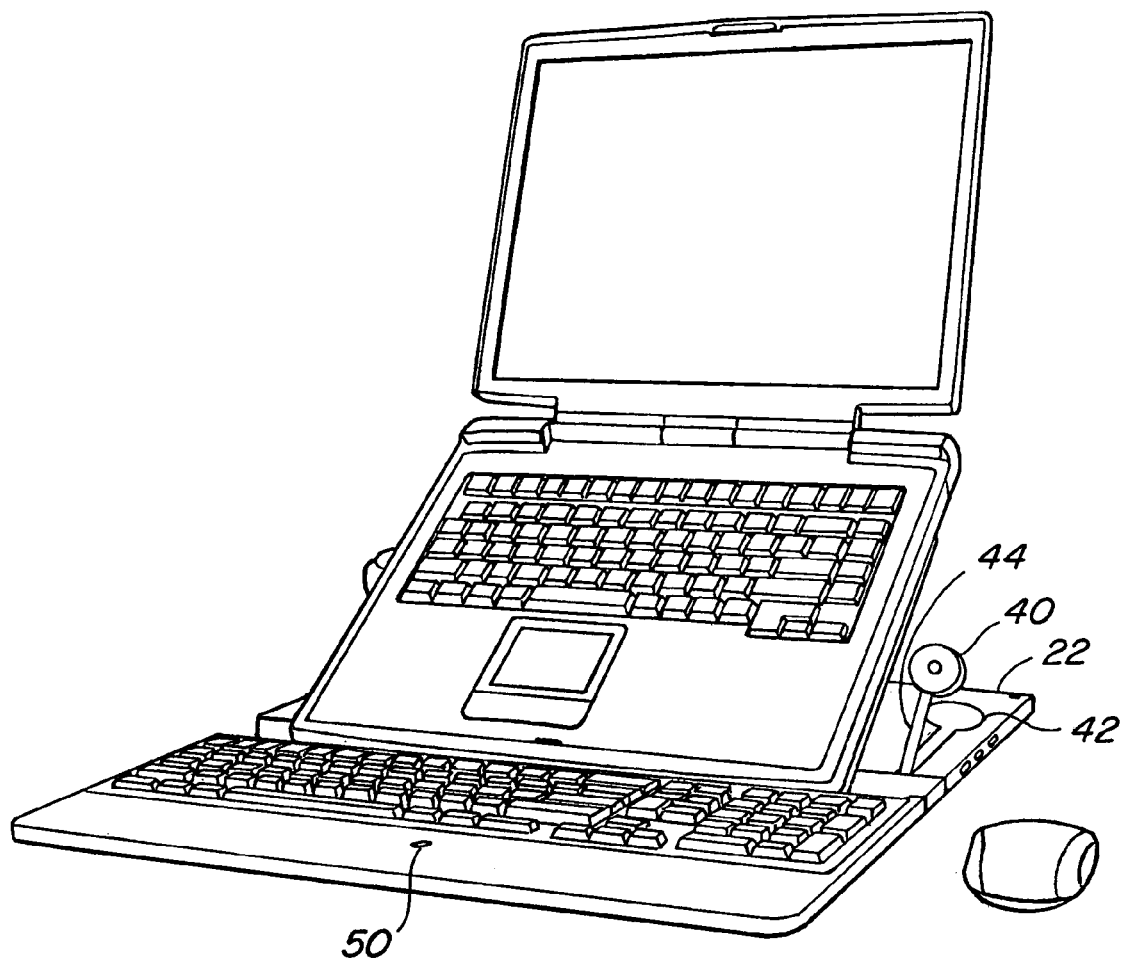
FIG. 7 is a perspective view of an embodiment of the invention showing a pop-up web cam.

FIG. 7 illustrates an optional web cam 40 which is normally stored in a recess 42 in cover 22. Upon pressing web cam 40 while it is in the recess, it is released and pops up to the position shown. The camera portion can be rotated on the web cam stand 44, such as with a ball and socket joint connector. Alternately, the web cam can be completely removed from recess 42 and placed on top of the display of the portable computer with an appropriate support. Web cam 40 can be connected to a port in cover 22, or in the laptop computer, either by a wire connector or wirelessly.

Flexible Hinge with Imbedded Electrical Connector

Figure 8:
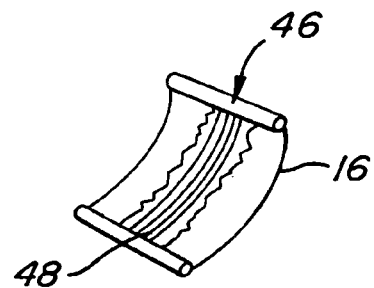
FIG. 8 is a diagram of a flexible hinge with a broken-away portion illustrating the imbedded flex circuit.

FIG. 8 illustrates a portion of the flexible hinge 16. A broken away portion 46 shows the interior flex circuit with a series of wire traces or wires 48. These wires can be used to provide the keyboard connection to a port or cable in the cover 22. That port then can connect through a wire such as the USB cable and connector 24 to plug into a laptop. Alternately, a parallel or other serial port can be used to provide the connection from the cover/stand portion to the laptop computer.

WiFi Card

In one embodiment, a WiFi or other wireless receiver card is built into the cover 22 or keyboard section 12, with a cable for coupling to the laptop. The cable can be similar to USB connector 24, and could be located anywhere on cover 22 or keyboard portion 12.

MP3 Player Docking Station, Speakers, Microphone

Figure 9:
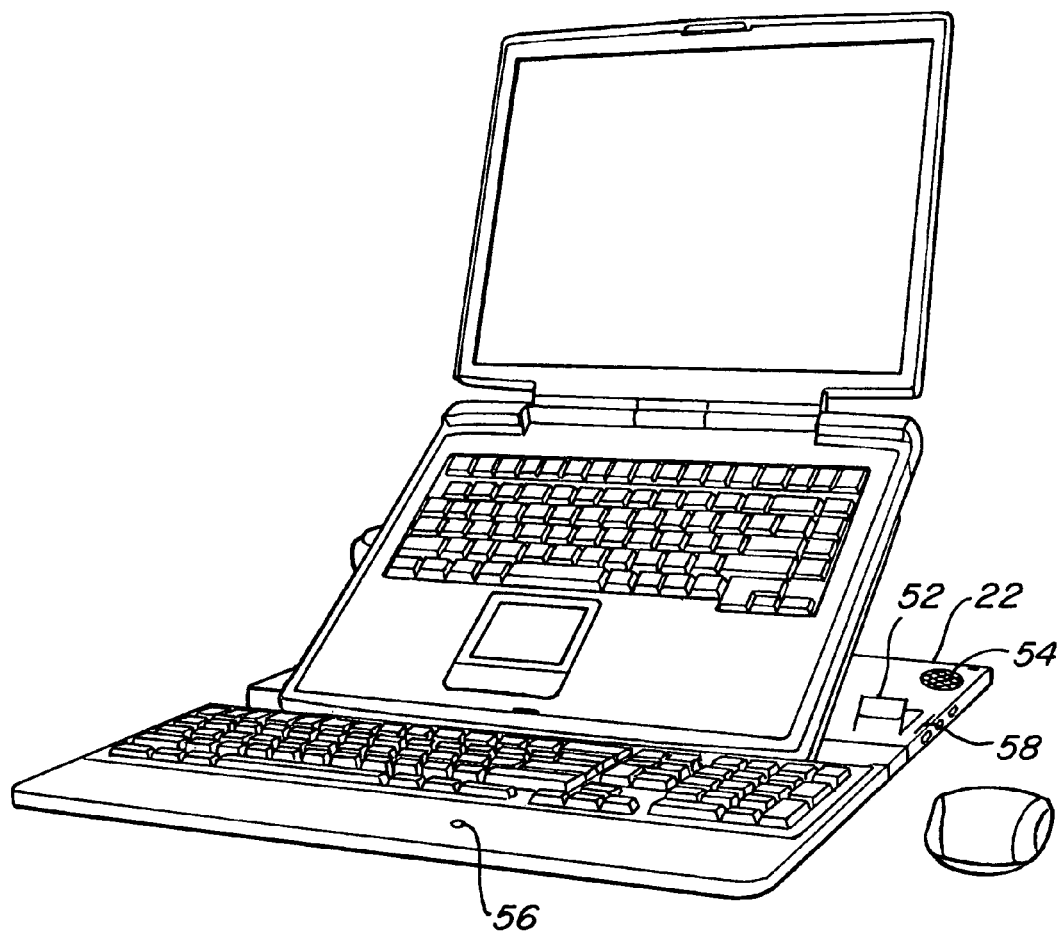
FIG. 9 is a perspective view of an embodiment with a pop-up MP3 player docking station, speakers and a microphone.

In another embodiment shown in FIG. 9, an MP3 player docking station 52 is provided. This can provide a connection to speakers 54 built into the two sides of the keyboard cover or the keyboard itself. Additionally, a microphone 56 can be embedded in the keyboard portion or the cover portion. Adjacent to docking station 52 is a cable connector 58, similar to the USB cable on the other side, for connecting to the speaker port of the MP3 player mounted on docking station 52. This cable internally connects to the speakers.

In one embodiment, a headset or microphone and speakers built into the cover/keyboard, or supported by them, can be used for VOIP calls. One or more function keys on the keyboard can be programmed for handling a VOIP call. A function key can be associated with a VOIP phone number (URL) for one-touch speed dialing for a VOIP call.

Wireless Connection, Cable Management, Other Devices

In one embodiment, the full-size keyboard and a mouse can wirelessly connect to a laptop through a USB receiver. The USB receiver can be imbedded in the keyboard or cover, or could be a USB stick stored in a recess in the cover, which can then be removed and plugged into the laptop when it is mounted. Alternately, the receiver can connect to a wire or wireless connector which plugs into a parallel port or other port of the laptop. The cover can include structure for holding cables to facilitate cable management. This can be used to secure cables for video, audio, network, etc. The cover can also provide the recesses for storing additional devices, such as memory sticks, remote controls, cable management, etc. Additional pop-up stands or docking stations can be provided in addition to, or in place of, those described above. For example, a headset stand can be provided.

Power, Battery

In one embodiment, the keyboard and other electronic devices in cover 22 are powered by a battery 17. The battery 17 can be in the keyboard section 12 or the cover 22. Electrical conductors through hinge 16 can provide power from the battery 17 to the other section. Alternately, a separate power cable can connect between keyboard section 12 and cover 22. Some or all of the electronic devices could be powered off of the USB hub when connected to another USB device which has power. For example, power can be provided from the USB or other connection to the laptop computer on the stand. A switching circuit can be provided to draw power from the battery 17 only when a USB or other source of power is not available. Power can also be provided from an external power brick when available.

Presence Sensor

In one embodiment as shown in FIG. 7, a presence sensor 50 is used to detect the presence of a user near the keyboard. When a user is not present for a period of time, the battery power to devices on the cover 22 are powered off. In one embodiment, sensor 50 is an IR (infrared) sensor, in particular a PIR (Pyroelectric IR) sensor, such as those made by muRata Manufacturing Co., Ltd. Power could be switched on and off in response to detection by the PIR sensor in a manner set forth in Logitech U.S. Pat. No. 6,781,570, the disclosure of which is incorporated herein by reference.

Battery power in one embodiment is maintained for the keyboard to provide quick responsiveness, but is turned off for the webcam and other power consuming circuitry in cover 22 in the absence of a person being detected for a predetermined amount of time.

In one embodiment, PIR sensor is placed at the front of the keyboard, facing toward the user and away from the laptop. In this manner, IR radiation from the lap top will not generate a false signal. A heat insulating barrier may also be imbedded in the housing between the PIR sensor and the laptop and other electronics of the cover 22 and keyboard that may produce IR radiation. In one embodiment, a sensor which detects a combination of IR and movement is used to avoid interference by heat from the computer.

In one embodiment, a sensor is used for detecting movement of the keyboard indicating said keyboard is no longer in use, for providing a signal to power down said electronics. For example, the sensor could detect the keyboard being lifted up, or folded against the cover. These could use a tilt sensor, or a light sensor which is blocked when the keyboard is folded against the cover.

Keyboard Controls on Cover

In one embodiment, some of the keys or other controls normally found on a keyboard can be placed on the cover 22. For example, some or all of the media controls found on a media keyboard can be placed on the cover, leaving more room for other functionality on the keyboard portion. Indicators normally on a keyboard, or additional indicators, could also be placed on the cover. For example, indicators for alerting to the reception of email, etc. could be placed on the cover.

As will be understood by those of skill in the art, the present invention may be embodied in other specific forms without departing from the essential characteristics thereof. For example, the stand could be used with a laptop having a removable display, with only the display being placed on the stand. The laptop computer could be connected via cables behind the stand or otherwise. Accordingly, the foregoing description is intended to be illustrative, but not limiting, of the scope of the invention which is set forth in the following claims.

What is claimed is:

1. A computer keyboard apparatus comprising:
a keyboard body housing a plurality of keys;
a support structure for supporting a portable computer in a position where the display of the portable computer is visible to a user of said keyboard and said display is elevated by the combination of said support structure elevating a back part of said portable computer higher than a front part, and the display of the portable computer folding open to an even higher position, with the height of the display being the combination of the folding open of the display and the extra elevation of the portion of the computer where the display connects to the portable computer;
at least one connecting member attaching said keyboard body to said support structure;
a first electrical connection from said keyboard to said support structure; and
a second electrical connection from said support structure to said portable computer.

2. The apparatus of claim 1 wherein said support structure includes a foldable support for said portable computer.

3. The apparatus of claim 2 wherein said foldable support includes a support surface for said portable computer; and
a flap attached to said support surface by a hinge, such that said flap is moveable to support said support surface and position said support surface at a plurality of angles.

4. The apparatus of claim 1 wherein said connecting member comprises a hinge.

5. The apparatus of claim 4 wherein said hinge includes electrical conductors for providing signals from said keyboard body to said support structure, and further comprising at least one port on said support structure for providing said signals to said portable computer.

6. The apparatus of claim 1 wherein said support structure comprises a cover for said keyboard body, said cover being openable to deploy said support structure.

7. The apparatus of claim 1 wherein said support structure includes electronics requiring power, and a battery for powering said electronics.

8. The apparatus of claim 7 further comprising a presence sensor for detecting when a user is not nearby, allowing powering down of said electronics.

9. The apparatus of claim 8 wherein said presence sensor includes a PIR sensor.

10. The apparatus of claim 1 wherein said support structure includes a plurality of USB connectors.

11. The apparatus of claim 10 wherein said support structure includes a USB hub.

12. The apparatus of claim 1 wherein said support structure includes imbedded speakers and a microphone.

13. The apparatus of claim 1 further comprising a camera imbedded in said apparatus.

14. The apparatus of claim 1 further comprising a wireless receiver in said support structure.

15. The apparatus of claim 1 further comprising an MP3 player docking station in said support structure.

16. The apparatus of claim 1 further comprising at least one control input on said support structure.

17. The apparatus of claim 16 wherein said control input comprises media controls.

18. The apparatus of claim 1 wherein said support structure includes a cable with a USB connector for connecting to a USB port of said portable computer.

19. The apparatus of claim 1 wherein said support structure includes a cable management structure for holding cables.

20. The apparatus of claim 1 wherein said keyboard body and support structure are foldable towards each other for storage, and further comprising a latch for securing said keyboard body to said support structure.

21. The apparatus of claim 1 wherein said keyboard body comprises a full-sized keyboard.

22. The apparatus of claim 1 further comprising keyboard tilt legs attached to said keyboard body.

23. The apparatus of claim 1 further comprising electronics in said apparatus requiring power, a battery, and a sensor for detecting movement of said keyboard indicating said keyboard is no longer in use, for providing a signal to power down said electronics.

24. A computer keyboard apparatus comprising:
a keyboard body housing a plurality of keys;
a support structure for supporting a portable computer in a position where the display of the portable computer is folded open and is visible to a user of said keyboard, said support structure being both a foldable support for said portable computer and a cover for said keyboard;
at least one hinge attaching said keyboard body to said support structure; and electrical conductors connecting said keyboard body to said support structure.

25. A computer keyboard apparatus comprising:
a keyboard body housing a plurality of keys;
a support structure for supporting a portable computer in a position where the display of the portable computer is folded open and is visible to a user of said keyboard, said support structure including
a foldable support for said portable computer,
a cover for said keyboard, and
a plurality of electrical devices;
at least one hinge attaching said keyboard body to said support structure;
electrical conductors connecting said keyboard body to said support structure; and
a USB cable connection from said support structure to said portable computer.

26. The apparatus of claim 25 wherein said electrical devices comprise imbedded speakers and a microphone.

27. The apparatus of claim 25 wherein said electrical devices comprise a camera.

28. The apparatus of claim 25 wherein said electrical devices comprise a wireless receiver.

29. The apparatus of claim 25 wherein said electrical devices comprise an MP3 player docking station.

30. The apparatus of claim 25 wherein said electrical devices comprise at least one control input.

31. The apparatus of claim 30 wherein said control input comprises media controls.

32. The apparatus of claim 25 wherein said electrical devices comprise a cable with a USB connector for connecting to a USB port of said portable computer.

33. The apparatus of claim 25 wherein said electrical devices comprise a cable management structure for holding cables.

* * * * *